(12) United States Patent
Sugiura et al.

(10) Patent No.: US 9,885,148 B2
(45) Date of Patent: Feb. 6, 2018

(54) LAMINATED SHEET AND METHOD OF MANUFACTURING THE SAME

(71) Applicants: KYOWA LEATHER CLOTH CO., LTD., Hamamatu-shi, Shizuoka (JP); TOYOTA JIDOSHA KABUSHIKI KAISHA, Toyota-shi, Aichi (JP)

(72) Inventors: Koji Sugiura, Hamamatsu (JP); Akinaka Fukumi, Hamamatsu (JP); Kenji Kubo, Hamamatsu (JP); Takanori Tatematsu, Nisshin (JP)

(73) Assignees: KYOWA LEATHER CLOTH CO., LTD., Shizuoka (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 237 days.

(21) Appl. No.: 14/651,734

(22) PCT Filed: Dec. 13, 2013

(86) PCT No.: PCT/JP2013/083530
§ 371 (c)(1),
(2) Date: Jun. 12, 2015

(87) PCT Pub. No.: WO2014/097999
PCT Pub. Date: Jun. 26, 2014

(65) Prior Publication Data
US 2015/0299944 A1    Oct. 22, 2015

(30) Foreign Application Priority Data
Dec. 18, 2012   (JP) .................................. 2012-276183

(51) Int. Cl.
*D06N 3/14*   (2006.01)
*D06N 7/06*   (2006.01)
(Continued)

(52) U.S. Cl.
CPC ............... *D06N 3/14* (2013.01); *B32B 3/266* (2013.01); *B32B 5/024* (2013.01); *B32B 5/24* (2013.01);
(Continued)

(58) Field of Classification Search
None
See application file for complete search history.

(56) References Cited

U.S. PATENT DOCUMENTS 2,400,182 A * 5/1946 Whitman ............... D03D 3/005
139/426 TW
2,400,379 A * 5/1946 Whitman ............... D03D 15/00
139/426 TW
(Continued)

FOREIGN PATENT DOCUMENTS

DE    3124750 A1 *  1/1983  ............. B32B 27/12
JP    S48-23883 B1    7/1973
(Continued)

OTHER PUBLICATIONS

Machine Translation of JP 07018584 A, Jan. 1995.*
(Continued)

*Primary Examiner* — Jeffrey A Vonch
(74) *Attorney, Agent, or Firm* — Oliff PLC (57) ABSTRACT

A laminated sheet includes a base cloth layer having a porous structure obtained by impregnating a woven fabric, which has a tear strength by a trapezoid method of 150 N or more in the longitudinal direction and 100 N or more in the lateral direction, with a resin composition containing a polyurethane resin and an organic flame retardant, and a skin layer layered on the base cloth layer, and has plural air holes penetrating in the thickness direction.

13 Claims, 5 Drawing Sheets

(51) Int. Cl.

| | | |
|---|---|---|
| *B32B 3/24* | (2006.01) |
| *B32B 5/08* | (2006.01) |
| *B32B 5/18* | (2006.01) |
| *B32B 27/04* | (2006.01) |
| *B32B 27/08* | (2006.01) |
| *B32B 27/18* | (2006.01) |
| *B32B 27/40* | (2006.01) |
| *B32B 33/00* | (2006.01) |
| *B32B 37/00* | (2006.01) |
| *B32B 38/04* | (2006.01) |
| *B32B 5/02* | (2006.01) |
| *B32B 5/24* | (2006.01) |
| *B32B 3/26* | (2006.01) |
| *B32B 27/12* | (2006.01) |
| *B32B 7/12* | (2006.01) |
| *B32B 7/02* | (2006.01) |
| *B32B 27/24* | (2006.01) |
| *B32B 27/26* | (2006.01) |
| *B32B 27/32* | (2006.01) |
| *B32B 37/12* | (2006.01) |
| *B32B 38/16* | (2006.01) |
| *B32B 38/08* | (2006.01) |
| *D03D 15/00* | (2006.01) |
| *D03D 1/00* | (2006.01) |
| *D06M 15/579* | (2006.01) |
| *D06M 15/576* | (2006.01) |
| *D03D 13/00* | (2006.01) |
| *D06N 3/00* | (2006.01) |
| *D06M 15/564* | (2006.01) |
| *B32B 27/20* | (2006.01) |
| *B32B 38/00* | (2006.01) |
| *B32B 27/06* | (2006.01) |
| *B32B 37/14* | (2006.01) |
| *B32B 27/02* | (2006.01) |
| *B32B 38/10* | (2006.01) |

(52) U.S. Cl.
CPC .............. *B32B 27/08* (2013.01); *B32B 27/12* (2013.01); *B32B 27/40* (2013.01); *B32B 37/14* (2013.01); *B32B 38/04* (2013.01); *D06N 3/0006* (2013.01); *D06N 3/0059* (2013.01); *B32B 5/18* (2013.01); *B32B 7/12* (2013.01); *B32B 27/02* (2013.01); *B32B 27/04* (2013.01); *B32B 27/065* (2013.01); *B32B 27/20* (2013.01); *B32B 27/24* (2013.01); *B32B 27/26* (2013.01); *B32B 33/00* (2013.01); *B32B 37/0038* (2013.01); *B32B 37/12* (2013.01); *B32B 37/1284* (2013.01); *B32B 37/144* (2013.01); *B32B 38/0012* (2013.01); *B32B 38/0032* (2013.01); *B32B 38/08* (2013.01); *B32B 38/10* (2013.01); *B32B 38/164* (2013.01); *B32B 2038/047* (2013.01); *B32B 2255/02* (2013.01); *B32B 2255/102* (2013.01); *B32B 2255/26* (2013.01); *B32B 2260/021* (2013.01); *B32B 2260/046* (2013.01); *B32B 2262/0276* (2013.01); *B32B 2262/12* (2013.01); *B32B 2305/026* (2013.01); *B32B 2305/07* (2013.01); *B32B 2305/18* (2013.01); *B32B 2305/188* (2013.01); *B32B 2307/3065* (2013.01); *B32B 2307/554* (2013.01); *B32B 2307/584* (2013.01); *B32B 2307/5825* (2013.01); *B32B 2307/724* (2013.01); *B32B 2307/726* (2013.01); *B32B 2375/00* (2013.01); *B32B 2437/02* (2013.01); *B32B 2601/00* (2013.01); *B32B 2605/003* (2013.01); *B32B 2605/08* (2013.01); *B32B 2607/02* (2013.01); *D03D 1/00* (2013.01); *D03D 13/00* (2013.01); *D03D 15/00* (2013.01); *D03D 15/0094* (2013.01); *D06M 15/564* (2013.01); *D06M 15/576* (2013.01); *D06M 15/579* (2013.01); *D06M 2200/30* (2013.01); *D06N 3/0052* (2013.01); *D06N 3/0054* (2013.01); *D06N 2201/10* (2013.01); *D06N 2203/068* (2013.01); *D06N 2205/246* (2013.01); *D06N 2209/067* (2013.01); *D06N 2209/10* (2013.01); *D06N 2209/105* (2013.01); *D06N 2209/123* (2013.01); *D06N 2211/14* (2013.01); *D06N 2211/263* (2013.01); *D06N 2211/28* (2013.01); *D06N 2213/04* (2013.01); *D06N 2213/045* (2013.01); *D10B 2401/00* (2013.01); *D10B 2401/10* (2013.01); *D10B 2505/08* (2013.01); *D10B 2505/12* (2013.01); *Y10S 428/904* (2013.01); *Y10S 428/921* (2013.01); *Y10T 156/1057* (2015.01); *Y10T 428/24322* (2015.01); *Y10T 428/249953* (2015.04); *Y10T 428/249987* (2015.04); *Y10T 428/249988* (2015.04); *Y10T 428/249991* (2015.04); *Y10T 442/2041* (2015.04); *Y10T 442/2139* (2015.04); *Y10T 442/2311* (2015.04); *Y10T 442/268* (2015.04); *Y10T 442/2631* (2015.04); *Y10T 442/2672* (2015.04); *Y10T 442/273* (2015.04); *Y10T 442/2705* (2015.04); *Y10T 442/2713* (2015.04); *Y10T 442/3065* (2015.04); *Y10T 442/322* (2015.04); *Y10T 442/3301* (2015.04); *Y10T 442/3854* (2015.04)

(56) References Cited

U.S. PATENT DOCUMENTS

| | | | | |
|---|---|---|---|---|
| 2,942,327 | A * | 6/1960 | Corry | D03D 15/00 428/360 |
| 3,262,805 | A * | 7/1966 | Aoki | D06N 3/0077 156/79 |
| 3,532,529 | A * | 10/1970 | Hiroshi | D04B 1/00 427/246 |
| 3,650,800 | A * | 3/1972 | Reiner | D06N 3/0009 26/29 R |
| 3,873,406 | A * | 3/1975 | Okazaki | D06N 3/0002 156/235 |
| 3,914,479 | A * | 10/1975 | Yamagata | D06N 3/126 264/41 |
| 4,038,513 | A * | 7/1977 | Steigerwald | B26F 1/31 219/121.18 |
| 4,103,054 | A * | 7/1978 | Okamoto | D01D 5/36 26/29 R |
| 5,230,937 | A * | 7/1993 | Effenberger | D06N 3/047 428/113 |
| 5,518,800 | A * | 5/1996 | Okawa | D06N 3/14 428/105 |
| 5,932,494 | A * | 8/1999 | Crippa | D03D 15/00 139/426 TW |
| 2002/0031964 | A1* | 3/2002 | Reisdorf | B32B 27/12 442/64 |
| 2003/0060104 | A1* | 3/2003 | Veiga | B32B 27/04 442/76 |
| 2003/0087084 | A1* | 5/2003 | Mori | B32B 5/18 428/318.4 |
| 2004/0121113 | A1* | 6/2004 | Mobley | D06N 3/0052 428/85 |
| 2008/0045104 | A1* | 2/2008 | Sugiyama | D06N 3/0004 442/141 |
| 2009/0047476 | A1 | 2/2009 | Meguro et al. | |
| 2009/0068412 | A1* | 3/2009 | Nahmias | B32B 5/022 428/172 |

(56) References Cited

U.S. PATENT DOCUMENTS

| | | | | |
|---|---|---|---|---|
| 2009/0181588 A1* | 7/2009 | Capwell | ................. | D06M 11/44 442/64 |
| 2009/0258182 A1* | 10/2009 | Okamoto | ............... | C09K 21/04 428/91 |
| 2009/0311480 A1* | 12/2009 | Fischer | .................. | B32B 27/12 428/160 |
| 2010/0068499 A1* | 3/2010 | Kanagawa | ........... | D06N 3/0056 428/318.6 |
| 2010/0247895 A1* | 9/2010 | Uemura | .................... | B32B 7/12 428/317.7 |
| 2013/0005206 A1* | 1/2013 | Krings | ................. | D06N 3/0052 442/76 |
| 2013/0089718 A1* | 4/2013 | Schaefer | .............. | D06N 3/0013 428/206 |
| 2013/0106081 A1* | 5/2013 | Kim | ..................... | B60R 21/235 280/730.2 |
| 2015/0159320 A1* | 6/2015 | Lau | ...................... | D06N 3/0006 442/59 |

FOREIGN PATENT DOCUMENTS

| | | | | | |
|---|---|---|---|---|---|
| JP | 53062804 | A | * | 6/1978 | |
| JP | 53111167 | A | * | 9/1978 | |
| JP | 54068461 | A | * | 6/1979 | |
| JP | 58065076 | A | * | 4/1983 | |
| JP | 63105191 | A | * | 5/1988 | |
| JP | 63249785 | A | * | 10/1988 | ........... D06N 3/0079 |
| JP | 02139482 | A | * | 5/1990 | ................ D06N 3/14 |
| JP | 04308279 | A | * | 10/1992 | |
| JP | 04308280 | A | * | 10/1992 | |
| JP | 05044137 | A | * | 2/1993 | |
| JP | 05163684 | A | * | 6/1993 | |
| JP | H07-18584 | A | | 1/1995 | |
| JP | 07132573 | A | * | 5/1995 | |
| JP | H07-132573 | A | | 5/1995 | |
| JP | 07197383 | A | * | 8/1995 | |
| JP | 11256483 | A | * | 9/1999 | |
| JP | H11-256483 | A | | 9/1999 | |
| JP | 2001140171 | A | * | 5/2001 | |
| JP | 2001164477 | A | * | 6/2001 | |
| JP | 2002069789 | A | * | 3/2002 | |
| JP | 2003239178 | A | * | 8/2003 | |
| JP | 2005060859 | A | * | 3/2005 | |
| JP | 2005226213 | A | * | 8/2005 | |
| JP | 2006104592 | A | * | 4/2006 | |
| JP | 2008-081916 | A | | 4/2008 | |
| JP | 2010222776 | A | * | 10/2010 | ............... B32B 5/06 |
| JP | 2010-248644 | A | | 11/2010 | |
| JP | 2010248683 | A | * | 11/2010 | |
| WO | 2007/099951 | A1 | | 9/2007 | |
| WO | WO 2011122800 | A2 | * | 10/2011 | ........... B60R 21/235 |
| WO | WO 2013170395 | A1 | * | 11/2013 | ........... D06N 3/0006 |

OTHER PUBLICATIONS

Machine Translation of JP 2001164477 A, Jun. 2001.*
Machine Translation of JP 201024864 A, Nov. 2010.*
Machine Translation of JP 11256483 A, Sep. 1999.*
Machine Translation of JP 2006104592 A, Apr. 2006.*
Machine Translation of BE 710826 A, Jun. 1968.*
Machine Translation of JP 58-065076 A, Apr. 1983.*
Machine Translation of JP 04-308280 A, Oct. 1992.*
Dec. 8, 2015 Office Action issued in Japanese Patent Application No. 2014-553117.

* cited by examiner

LAMINATED SHEET AND METHOD OF MANUFACTURING THE SAME

TECHNICAL FIELD

The present invention relates to a laminated sheet and a method of manufacturing the same.

BACKGROUND ART

In recent years, synthetic resin skin materials which excel in durability are heavily used for automobile interior parts (instrument panel, door trim, seat, ceiling, and the like), railroad car/aircraft interior parts (trim, seat, ceiling, and the like), furniture, shoes, footwear, bags, interior/exterior members for building, mounting materials/linings for clothes, wall covering materials, and the like, in place of natural leather or fibrous sheets. For example, in the case of automobile interior parts, it is increasingly important to impart luxuriousness to interior skin materials with upgrading of automobiles. In addition, air permeability either equaling or surpassing natural leather is also required.

Generally, synthetic leather is classified roughly into dry synthetic leather in which a base cloth that is not subjected to processing and a skin are stuck together, and wet synthetic leather in which a base cloth is subjected to wet processing to form a wet base, and the wet base and a skin are stuck together.

For example, Japanese Patent Application Laid-Open (JP-A) No. H11-256483 discloses a decorative laminated sheet having a colored layer and an opaque skin layer having a different color from the colored layer and being layered thereon, in which plural holes are provided which penetrate at least the colored layer and the opaque skin layer, and through which a color of the colored layer below the opaque skin layer when viewed from the skin layer side can be visually confirmed.

SUMMARY OF INVENTION

Perforation processing is performed so as to obtain moisture permeability and air permeability in a laminated sheet used as synthetic leather, but the perforation may cause a decrease in strength including tear strength and surface abrasion resistance of the synthetic leather.

By performing perforation processing, in dry synthetic leather, distortion of holes and a significant decrease in strength easily occur according to the kind of a base cloth.

Also in wet synthetic leather, strength sometimes cannot be sufficiently obtained according to physical properties of a base cloth that is to be a base material, and in addition, air permeability is increased by forming holes, as a result of which flame resistance tends to be decreased. Furthermore, when a base cloth is impregnated with a urethane resin to be a wet base, the urethane resin penetrates the base cloth, and thus, flame resistance tends to be decreased.

In addition, perforation processing easily causes a poor appearance, for example, fray of a base cloth is visible through holes, and holes are distorted because of soft synthetic leather.

In addition, when performing roughening processing (buff processing) before sticking a base cloth and a skin layer together, a yarn configuring the base cloth is torn, and thus, strength may be decreased.

Furthermore, in terms of abrasion resistance, peripheries of holes are rubbed down, and thus, abrasion resistance tends to be insufficient.

It is an object of the invention to provide a laminated sheet which has high tear strength, moisture permeability, air permeability, and flame resistance and excels in an appearance of air holes, and a method of manufacturing a laminated sheet by which the laminated sheet can be manufactured by simple processes.

The present inventors conducted extensive research, and found that by performing perforation processing in a laminate including a base cloth layer having a porous structure, which is obtained by impregnating a specific woven fabric with a resin solution containing a polyurethane resin and an organic flame retardant to unify these elements, a laminated sheet can be obtained which has high tear strength, moisture permeability, air permeability, and flame resistance and also excels in terms of the appearance of air holes.

More specifically, the following invention is provided so as to achieve the object.

<1> A laminated sheet including:
a base cloth layer having a porous structure that is obtained by impregnating a woven fabric, which has a tear strength by a trapezoid method of 150 N or more in the longitudinal direction and 100 N or more in the lateral direction, with a resin composition containing a polyurethane resin and an organic flame retardant; and
a skin layer layered on the base cloth layer,
the laminated sheet having plural air holes that penetrate in the thickness direction.

<2> The laminated sheet according to <1>, wherein the woven fabric is twilled using a No. 5 to No. 30 count single yarn as a warp yarn and a No. 10 to No. 40 count two-ply to four-ply twisted yarn as a weft yarn.

<3> The laminated sheet according to <1> or <2>, wherein the organic flame retardant is a phosphorous flame retardant.

<4> The laminated sheet according to any one of <1> to <3>, further comprising an abrasion-resistant layer on the skin layer.

<5> A method of manufacturing a laminated sheet comprising:
a step of impregnating a woven fabric, which has a tear strength by trapezoid method of 150 N or more in a longitudinal direction and 100 N or more in a lateral direction, with a resin solution containing a polyurethane resin, an organic flame retardant, and a solvent,
a step of soaking the woven fabric, which has been impregnated with the resin solution, in water to remove the solvent from the woven fabric and solidify the polyurethane resin,
a step of drying the woven fabric in which the polyurethane resin is solidified to form a base cloth layer having a porous structure,
a step of roughening one surface of the base cloth layer,
a step of forming a laminate in which a skin layer is layered on the roughened surface of the base cloth layer, and
a step of forming plural air holes penetrating in the thickness direction of the laminate.

According to the invention, a laminated sheet which has high tear strength, moisture permeability, air permeability, and flame resistance and excels in an appearance of air holes is provided. In addition, according to the invention, a method of manufacturing a laminated sheet by which the laminated sheet can be manufactured by a simple step is provided.

DESCRIPTION OF EMBODIMENTS

Hereinafter, embodiments of the invention will be described with reference to the accompanying drawings.

[Laminated Sheet]

A laminated sheet of the invention has a base cloth layer having a porous structure obtained by impregnating a woven fabric, which has a tear strength by a trapezoid method of 150 N or more in the longitudinal direction and 100 N or more in the lateral direction, with a resin composition containing a polyurethane resin and an organic flame retardant, and a skin layer layered on the base cloth layer, and has plural air holes penetrating in the thickness direction.

Figure 1:
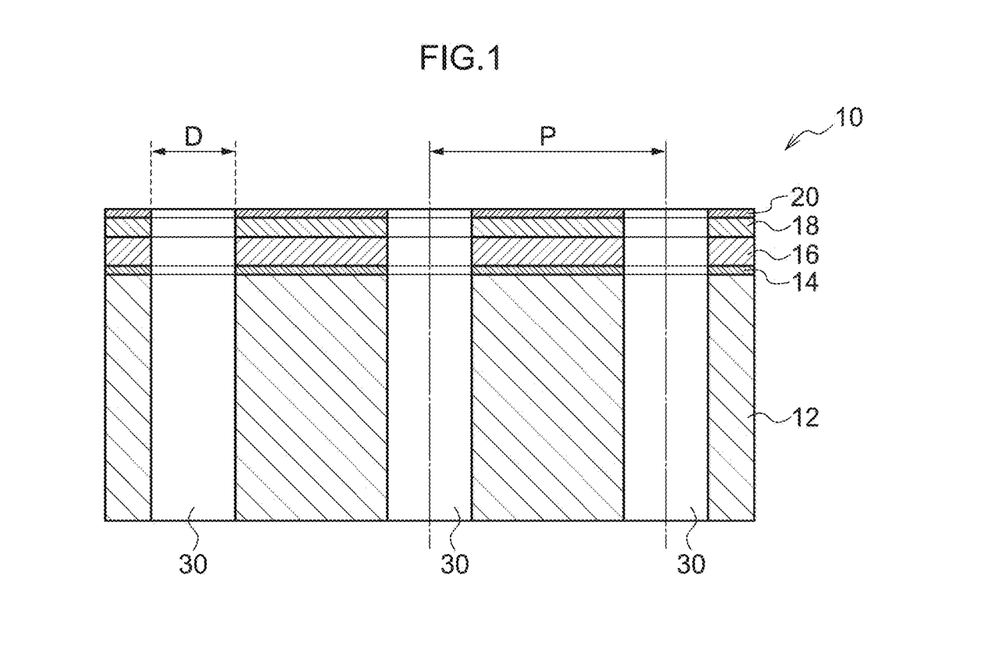
FIG. 1 is a schematic cross-sectional diagram illustrating a cross section of one example of a laminated sheet of the invention in the thickness direction.
Figure 2:
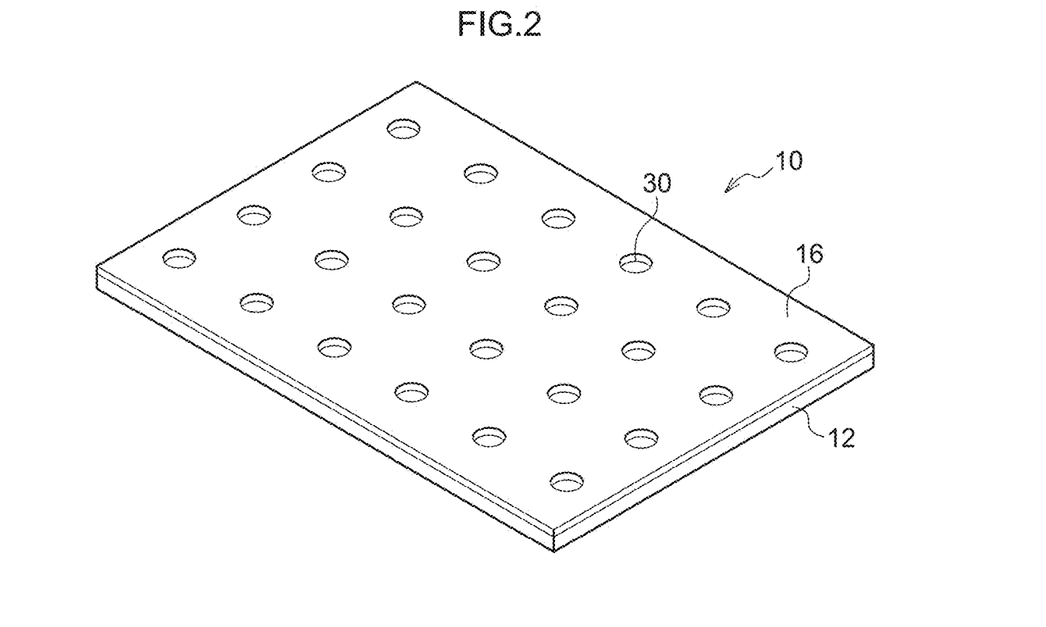
FIG. 2 is a schematic perspective diagram illustrating one example of arrangement of air holes of the laminated sheet of the invention.

FIG. 1 schematically illustrates a cross section of one example of the laminated sheet of the invention in the thickness direction, and FIG. 2 schematically illustrates one example of arrangement of the air holes of the laminated sheet of the invention. In a laminated sheet 10 according to the present embodiment, a base cloth layer 12, an adhesive layer 14, a skin layer 16, an abrasion-resistant layer 18, and a tactile processing layer 20 are sequentially layered, and a large number of air holes 30 penetrating in the thickness direction are provided by perforation processing. In FIG. 2, the adhesive layer 14, the abrasion-resistant layer 18, and the tactile processing layer 20 are omitted.

Hereinafter, each configuration of the laminated sheet 10 illustrated in FIG. 1 and FIG. 2 will be described, but the laminated sheet 10 according to the invention is not limited to the configuration illustrated in these drawings. For example, the abrasion-resistant layer 18 and the tactile processing layer 20 may be provided, as necessary, and an intermediate layer for imparting elasticity, flexibility, and the like may be provided between the adhesive layer 14 and the skin layer 16.

<Base Cloth Layer>

The base cloth layer 12 has a porous structure obtained by impregnating a woven fabric, which has a tear strength by a trapezoid method of 150 N or more in the longitudinal direction and 100 N or more in the lateral direction, with a resin composition containing a polyurethane resin and an organic flame retardant.

(Woven Fabric)

As a base cloth for configuring the base cloth layer 12, a high-strength woven fabric, which has a tear strength by JIS L1096 8.15.4 C method (trapezoid method) of 150 N or more in the longitudinal direction and 100 N or more in the lateral direction, is used. The woven fabric preferably has a tear strength of 180 N or more in the longitudinal direction and 120 N or more in the lateral direction, and more preferably has a tear strength of 200 N or more in the longitudinal direction and 150 N or more in the lateral direction.

Specifically, the tear strength by JIS L1096:1999 8.15.4 C method (trapezoid method) is measured as follows.

Figure 6:
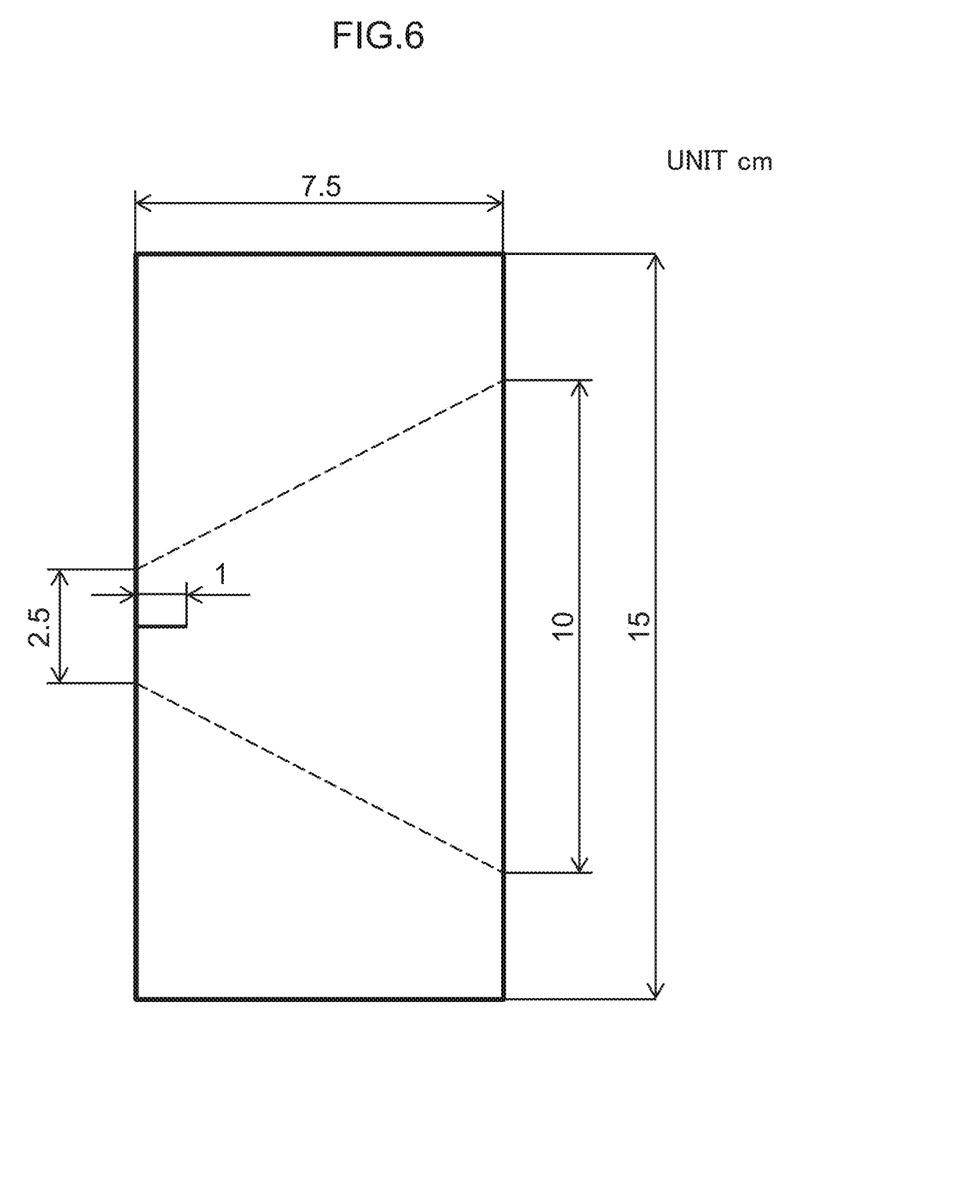
FIG. 6 is a diagram illustrating a shape of a test piece for measuring tear strength of a base cloth by a trapezoid method.
Figure 7:
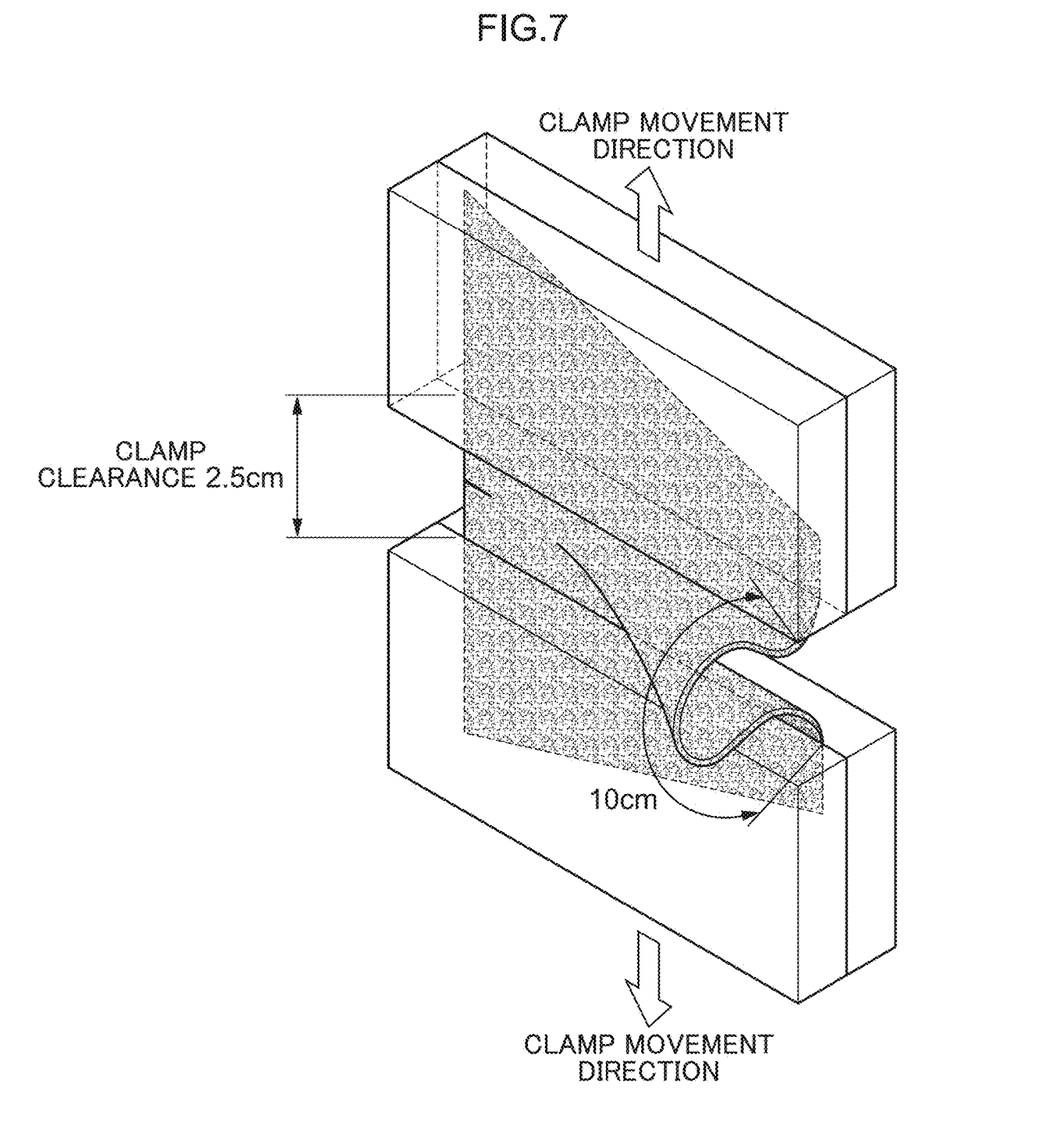
FIG. 7 is a diagram for explaining a method of measuring tear strength of a base cloth by a trapezoid method.

Three test pieces having a size of 7.5 cm=15 cm are collected in each of the longitudinal direction and the lateral direction. An isosceles trapezoid mark is put on each test piece as illustrated in FIG. 6, and a 1 cm cut is made at the center of the short side of this mark so as to be perpendicular to the side. Using a tension tester with a clamp having a width of 7.5 cm or more, a distance between grips for a test piece is 2.5 cm as illustrated in FIG. 7, and the test piece is held by the clamp along the isosceles trapezoid mark (dotted line region) while straining the short side of the trapezoid and loosening the long side of the trapezoid. A maximum load (tear strength) (N {kgf}) indicating the time of tearing in each of the longitudinal direction and the lateral direction at a tension rate of 20 cm per minute is measured, an average value of each of weft tear strength and warp tear strength (N {kgf}) is calculated, and the average value is rounded to one decimal place.

As a material of a yarn configuring the woven fabric, for example, when a polyester long fiber is used as a warp yarn and a weft yarn, the strength of the base cloth may become weak, and the tear strength when forming the holes 30 may become insufficient. Examples of the warp yarn and the weft yarn for achieving sufficient tear strength include polyester/rayon (65/35) and polyester (100%).

The diameter of a single yarn depends on the yarn material, and for example, the warp yarn is from No. 5 to No. 30 count, and the weft yarn is from No. 10 to No. 40 count.

For example, a woven fabric that is twilled using a No. 5 to No. 30 count single yarn as the warp yarn and a No. 10 to No. 40 count two-ply to four-ply twisted yarn as the weft yarn is preferable. By using the two-ply to four-ply twisted yarn as the weft yarn, the tear strength of the base cloth becomes 110 N or more, and sufficient tear strength is easily obtained even when forming the holes.

In the woven fabric that is twilled using the two-ply to four-ply twisted yarn as the weft yarn, sufficient tear strength can be obtained, and irregularities (waves) of the base cloth are fewer and a decrease in an abrasion property of a surface is suppressed compared with the case of using a five-ply twisted yarn. In addition, compared with the case of a woven fabric using a five-ply twisted yarn, perforation is easier, and fluff and fraying yarns are not easily generated, and therefore, holes having a favorable appearance can be easily formed.

In addition, the number of yarns in the woven fabric depends on the yarn material and the diameter (count), and for example, it is preferable that the warp yarn is from 40 to 80/inch and the weft yarn is from 20 to 50/inch so as to achieve a tear strength of 150 N or more in the longitudinal direction and 100 N or more in the lateral direction.

(Polyurethane Resin)

The woven fabric is impregnated with a polyurethane resin contained in the base cloth layer 12, and the polyurethane resin contained in the base cloth layer 12 forms a porous structure together with the woven fabric. Examples of the polyurethane resin contained in the base cloth layer 12 include polycarbonate polyurethane, polyether polyurethane, and polyester polyurethane. From the viewpoints of hydrolysis resistance, heat degradation resistance, and the like, polycarbonate polyurethane and polyether polyurethane are preferable.

It is preferable that the content of the polyurethane resin in the base cloth layer 12 is from 10 to 40 parts by mass with respect to 100 parts by mass of the woven fabric.

When the content of the polyurethane resin is 10 parts by mass or more with respect to 100 parts by mass of the woven fabric, moderate hardness is imparted to the base cloth layer 12, and deformation of the holes 30 when forming the holes 30 can be prevented, and when the content of the polyurethane resin is 40 parts by mass or less, the flexibility of the base cloth layer 12 can be maintained.

From the viewpoints, the content of the polyurethane resin in the base cloth layer 12 is more preferably from 15 to 35 parts by mass, and particularly preferably from 20 to 30 parts by mass with respect to 100 parts by mass of the woven fabric.

(Organic Flame Retardant)

As a flame retardant contained in the base cloth layer 12, an organic flame retardant is used. Examples of the organic flame retardant include a phosphorous flame retardant, a nitrogen-phosphorous flame retardant, and a halogen flame retardant, and an organic phosphoric acid flame retardant is preferable, and an organic phosphoric acid chloride is more preferable.

Examples of a flame retardant include an inorganic flame retardant such as aluminum hydroxide, and when an inorganic flame retardant is used, an effect of decreasing a combustion temperature is obtained, but an effect of suppressing combustion is small in the laminated sheet that has the air holes and is easy to be burned. In contrast, an organic flame retardant is easy to be dissolved or dispersed in a resin solution, and when impregnating the woven fabric with the resin solution, the organic flame retardant is spread to the entire woven fabric with the polyurethane resin, and a high effect of suppressing combustion of the laminated sheet is obtained. In addition, by using an organic flame retardant, the strength of the base cloth layer is easy to be increased compared with the case of using an inorganic flame retardant.

An organic flame retardant is available as a commercial product, and examples of the commercial product include a commercial product using triphenyl phosphate, tricresyl phosphate, or the like.

It is preferable that the content of the organic flame retardant in the base cloth layer 12 is from 10 to 30 parts by mass with respect to 100 parts by mass of the polyurethane resin. When the content of the organic flame retardant in the base cloth layer 12 is 10 parts by mass or more with respect to 100 parts by mass of the polyurethane resin, high flame resistance is exerted even when perforation processing is performed, and when the content of the organic flame retardant is 30 parts by mass or less, a decrease in flexibility caused by addition of an excessive amount can be suppressed.

From the viewpoints, the content of the organic flame retardant in the base cloth layer 12 is more preferably from 15 to 25 parts by mass, and particularly preferably from 17 to 23 parts by mass with respect to 100 parts by mass of the polyurethane resin.

(Other Components)

The base cloth layer 12 may contain other additives in addition to the woven fabric, the polyurethane resin, and the organic flame retardant. Examples of the other additives include a colorant such as a pigment, and a leveling agent.

Examples of the colorant that can be contained in the base cloth layer 12 include a colored organic resin particle obtained by including a colorant in an organic resin fine particle selected from a urethane resin particle, an acrylic resin particle, a silicone resin particle, a polycarbonate resin particle, or the like. In particular, from the viewpoints of affinity for the polyurethane resin as a dispersion medium, and uniform dispersibility, it is preferable to contain a polycarbonate colored resin particle.

Generally, the average particle diameter of such a colored resin particle is preferably in the range of 0.5 μm to 100 μm, and more preferably in the range of 3 μm to 50 μm.

The thickness of the base cloth layer 12 is preferably from 0.5 to 1.5 mm. When the thickness of the base cloth layer 12 is 0.5 mm or more, the laminated sheet 10 can be made to have high tear strength, and when the thickness of the base cloth layer 12 is 1.5 mm or less, the flexibility of the laminated sheet 10 can be maintained.

From the viewpoints, the thickness of the base cloth layer 12 is more preferably from 0.7 to 1.3 mm, and particularly preferably from 0.9 to 1.1 mm.

<Adhesive Layer>

The adhesive layer 14 is configured by an adhesive agent, and bonds the base cloth layer 12 and the skin layer 16. Examples of a material configuring the adhesive layer 14 include a polyurethane resin, a flame retardant, and a pigment.

When the thickness of the adhesive layer 14 is too thin, adhesive force becomes insufficient, and when the thickness of the adhesive layer 14 is too thick, the flexibility of the laminated sheet 10 is decreased. From such viewpoints, the thickness of the adhesive layer 14 is preferably from 40 to 80 μm, more preferably from 50 to 70 μm, and particularly preferably from 55 to 65 μm.

<Skin Layer>

The skin layer 16 is provided so as to mainly impart design, strength, abrasion resistance, and the like to the laminated sheet 10, and is configured by including a resin and a colorant.

A resin configuring the skin layer 16 is appropriately selected depending on the intended use of the laminated sheet 10. For example, a polycarbonate resin, an aqueous polyurethane resin, a silicone-modified polyurethane resin, a polyether-modified polyester resin, and the like are used, and from the viewpoint that heat resistance and chemical resistance are favorable, a polycarbonate resin is preferable.

Examples of the colorant contained in the skin layer 16 include a colored organic resin particle obtained by including a colorant in an organic resin fine particle selected from a urethane resin particle, an acrylic resin particle, a silicone resin particle, a polycarbonate resin particle, or the like. In particular, from the viewpoints of affinity for the polyurethane resin as a dispersion medium, and uniform dispersibility, it is preferable to contain a polycarbonate colored resin particle.

Generally, the average particle diameter of the organic resin fine particle used as the colorant is preferably in the range of 0.5 μm to 100 μm, and more preferably in the range of 3 μm to 50 μm.

The content of the colorant in the skin layer 16 may be selected depending on the intended use of the laminated sheet 10.

When the thickness of the skin layer 16 is too thin, the skin layer 16 is easily torn and may detract from the appearance, and when the thickness of the skin layer 16 is too thick, the flexibility of the laminated sheet 10 is decreased. From the viewpoints, the thickness of the skin layer 16 is preferably from 15 to 60 μm, more preferably from 20 to 50 μm, and particularly preferably from 30 to 40 μm.

<Abrasion-Resistant Layer>

The abrasion-resistant layer 18 is provided so as to mainly impart abrasion resistance, if necessary. The abrasion-resistant layer 18 contains, for example, a resin, a lubricant, and a cross-linking agent, and is configured to further contain other additives such as a delustering agent, if necessary.

The resin contained in the abrasion-resistant layer 18 is a main agent of the abrasion-resistant layer 18, and examples of the resin include polycarbonate urethane.

As the lubricant contained in the abrasion-resistant layer 18, silicone is preferable, and examples of a commercial product include BYK (registered trademark)-306 (manufactured by BYK Japan KK).

The content of the lubricant in the abrasion-resistant layer 18 is, for example, from 5 to 15 mass %.

Examples of the cross-linking agent contained in the abrasion-resistant layer 18 include a carbodiimide cross-linking agent. Examples of a commercial product include CARBODILITE (registered trademark) E-02 (manufactured by Nisshinbo Chemical Inc.).

The content of the cross-linking agent in the abrasion-resistant layer 18, as the amount added before cross-linking, is, for example, from 5 to 20 mass %.

As the delustering agent that can be contained in the abrasion-resistant layer 18, silica and beads are preferable, and examples of a commercial product include CERACOL (registered trademark, manufactured by BYK Japan KK), TK-600T (manufactured by Negami Chemical Industrial Co., Ltd), and C-100 (manufactured by Negami Chemical Industrial Co., Ltd).

In addition, examples of the other additives that can be contained in the abrasion-resistant layer 18 include a pigment.

The total content of the delustering agent and the other additives in the abrasion-resistant layer 18 is, for example, from 5 to 30 mass %.

When the thickness of the abrasion-resistant layer 18 is too thin, abrasion resistance cannot be sufficiently obtained, and the abrasion-resistant layer 18 is torn during use and may detract from the appearance, and when the thickness of the abrasion-resistant layer 18 is too thick, the flexibility of the laminated sheet 10 is decreased. From such viewpoints, the thickness of the abrasion-resistant layer 18 is preferably from 2 to 15 μm, more preferably from 4 to 13 μm, and particularly preferably from 6 to 10 μm.

<Tactile Processing Layer>

The tactile processing layer 20 is provided so as to impart smooth texture, if necessary. The tactile processing layer 20 is configured to contain a resin, a lubricant, and a delustering agent.

Examples of the resin configuring the tactile processing layer 20 include silicone-modified polycarbonate polyurethane.

When the thickness of the tactile processing layer 20 is too thin, smooth texture cannot be imparted, and the tactile processing layer 20 is torn and may detract from the appearance, and when the thickness of the tactile processing layer 20 is too thick, the flexibility of the laminated sheet 10 is easy to be decreased. From such viewpoints, the thickness of the tactile processing layer 20 is preferably from 0.5 to 5.0 μm, more preferably from 1.0 to 4.0 μm, and particularly preferably from 1.5 to 3.5 μm.

<Air Holes>

The plural air holes 30 which penetrate in the thickness direction are provided in the laminated sheet 10.

The shape of each of the air holes 30 is not particularly limited, and may be a circular shape or a polygonal shape in plan view, depending on the intended use. From the viewpoint of imparting higher strength to the laminated sheet 10, it is preferable that the shape is a circular shape in plan view, that is, that cylindrically-shaped air holes 30 are provided in the thickness direction of the laminated sheet 10.

The arrangement pattern of the air holes 30 is not particularly limited, and the air holes 30 may be regularly provided or irregularly provided. From the viewpoint of imparting uniform air permeability and tear strength over the entire laminated sheet, it is preferable that the air holes 30 are regularly arranged at a predetermined pitch.

The hole diameter D of each of the air holes 30 depends on the intended purpose, and, from the viewpoint of achieving both air permeability and strength of the entire laminated sheet, is preferably from 0.5 to 2.0 mm, and more preferably from 1.0 to 1.5 mm.

The pitch P of the air holes 30 depends on the intended purpose, and, from the viewpoint of achieving both air permeability and strength of the entire laminated sheet, is preferably from 3.0 to 8.0 mm, and more preferably from 4.0 to 7.0 mm.

The aperture ratio of the laminated sheet 10 (total area of air holes 30/area of laminated sheet 10) depends on the intended purpose, and, from the viewpoint of achieving both air permeability and strength of the entire laminated sheet, is preferably from 5 to 20%, and more preferably from 10 to 15%.

[Method of Manufacturing Laminated Sheet]

Next, a method of manufacturing the laminated sheet 10 according to the embodiment will be described. The method of manufacturing the laminated sheet 10 according to the embodiment is not particularly limited, and the laminated sheet 10 can be suitably manufactured by a method including a step of impregnating a woven fabric, which has a tear strength (by trapezoid method) of 150 N or more in the longitudinal direction and 100 N or more in the lateral direction, with a resin solution containing a polyurethane resin, an organic flame retardant, and a solvent, a step of soaking the woven fabric, which has been impregnated with the resin solution, in water to remove the solvent from the woven fabric and solidify the polyurethane resin, a step of drying the woven fabric in which the polyurethane resin is solidified to form a base cloth layer 12 having a porous structure, a step of roughening one surface of the base cloth layer 12, a step of forming a laminate in which a skin layer 16 is layered on the roughened surface of the base cloth layer 12, and a step of forming plural air holes 30 which penetrate in the thickness direction of the laminate.

<Impregnating Step>

Firstly, a woven fabric, which has a tear strength by a trapezoid method of 150 N or more in the longitudinal direction and 100 N or more in the lateral direction, is impregnated with a resin solution containing a polyurethane resin, an organic flame retardant, and a solvent.

The solvent used for preparation of the resin solution is not particularly limited as long as the solvent can dissolve or disperse the polyurethane resin, the organic flame retardant, and additives that are further added, if necessary. Examples of the solvent include methyl ethyl ketone (MEK), toluene, tetrahydrofuran (THF), dimethylacetamide (DMAC), N,N-dimethylformamide (DMF), isopropyl alcohol (IPA), and N-methyl-2-pyrrolidone (NMP).

The woven fabric is impregnated with the polyurethane resin and the organic flame retardant such that, for example, the woven fabric is 370±30 g/m$^2$, the polyurethane resin is 105±10 g/m$^2$, and the flame retardant is 50±5 g/m$^2$ in the base cloth layer 12 in a dry condition.

A method of impregnating the woven fabric with the resin solution is not limited, and for example, the woven fabric may be impregnated with the resin solution by applying the resin solution to the woven fabric by a known method, or the woven fabric may be impregnated with the resin solution by putting the woven fabric into a container containing the resin solution.

<Desolventizing/Solidifying Step>

By soaking the woven fabric, which has been impregnated with the resin solution containing a polyurethane resin, an organic flame retardant, and a solvent, in water, the solvent in the resin solution contained in the woven fabric is replaced with water to be removed (desolventizing), and the polyurethane resin is solidified.

<Drying Step>

Next, the woven fabric in which the impregnating polyurethane resin is solidified is dried to form a base cloth layer 12 having a porous structure. For example, the woven fabric containing the solidified polyurethane resin and water is dehydrated by a mangle, and then is dried under hot air at 100° C. to 120° C. so that the base cloth layer (wet microporous layer) 12 having a porous structure is formed.

<Roughening Step>

Next, one surface of the base cloth layer 12 is roughened. For example, one surface of the base cloth layer 12 is roughened by a buffing machine so that the one surface of the base cloth layer 12 is slightly napped.

<Layering Step>

Next, a laminate in which a skin layer 16 is layered on the roughened surface of the base cloth layer 12 is formed.

For example, silicone-modified polyurethane is applied to an embossed release paper, and is dried by heating to form a silicone-modified polyurethane skin layer 16 having an intended thickness.

Next, a polyurethane adhesive agent is applied to the skin layer 16, and then is dried by heating to form a polyurethane adhesive layer 14 having an intended thickness.

When an intermediate layer for imparting elasticity or flexibility is provided between the adhesive layer 14 and the skin layer 16, the intermediate layer is formed on the skin layer 16 before forming the adhesive layer 14.

A method of applying an application liquid for forming each of the skin layer 16, the intermediate layer, and the adhesive layer 14 is not particularly limited, and a known method may be used. For example, from the viewpoint of being suitable for a thick-coating property for achieving a sufficient thickness by one application, a knife coat method, a lip coat method, a die coat method, and the like are particularly preferable.

Next, the napped surface of the base cloth layer 12 is opposed to a surface of the adhesive layer 14, the base cloth layer 12 and the adhesive layer 14 are thermocompression bonded and matured, and the adhesive agent is reacted and solidified. After the adhesive layer 14 is solidified, the laminate is obtained by peeling off the release paper.

<Abrasion-Resistant Processing Step>

An abrasion-resistant layer 18 is provided on the skin layer 16, if necessary. For example, an application liquid for forming an abrasion-resistant layer, which is obtained by adding a polyurethane resin, a lubricant, a cross-linking agent, a delustering agent, and other additives to a solvent at the intended amounts, respectively, is prepared, is applied on the skin layer 16 by a known application method such as roll coating, and then is dried.

<Tactile Processing Step>

In addition, a tactile processing layer 20 is provided on the skin layer 16 or the abrasion-resistant layer 18, if necessary.

For example, an application liquid for forming a tactile processing layer, which is obtained by adding a polyurethane resin, a medium, and an additive to a solvent at the intended amounts, respectively, is prepared, is applied on the skin layer 16 or the abrasion-resistant layer 18 by a known application method such as roll coating, and then is dried.

<Perforating Step>

Next, plural air holes 30 penetrating in the thickness direction of the laminate are formed. For example, the air holes 30, each having an intended diameter, are perforated in the laminate at an intended pitch by a punching roll. In this manner, a laminated sheet 10 having a large number of air holes 30 penetrating in the thickness direction is manufactured.

According to the above-described method, in the base cloth layer 12 that serves as a support, the woven fabric is impregnated with the polyurethane resin and is reinforced, and thus, the laminate is not easily deformed in perforation processing, and air holes 30 that each have an opening that is substantially a true circle can be formed.

In addition, the yarn configuring the woven fabric of the base cloth layer 12 is cut by the perforation, but the woven fabric is reinforced by the solidified polyurethane resin, and thus, impairment of the appearance caused by protrusion of the cut fraying yarns into the inside of the air holes 30 and toward the outside is suppressed.

Furthermore, the organic flame retardant exists in the inner walls of the air holes 30 in the base cloth layer 12, and thus, high flame resistance is also exhibited in the air holes 30.

Therefore, the laminated sheet 10 of the invention manufactured through the above-described steps has high tear strength, moisture permeability, air permeability, and flame resistance, and excels in the appearance of the air holes. The laminated sheet 10 of the invention has high quality, and has moisture permeability and air permeability, and therefore, does not easily get sweaty and excels in comfort when being used in contact with a human body, and can be used as synthetic leather suitable for automobile interior materials, footwear mainly including shoes, and chair upholsteries.

EXAMPLES

Hereinafter, the invention will be specifically described with examples, but the invention is not limited to them.

Example 1

(Formation of Base Cloth Layer)

A woven fabric that was twilled using yarns having a configuration shown in the following Table 1 was prepared, as a base cloth. The tear strength by a trapezoid method of this woven fabric was measured by a tensilon tester (manufactured by ORIENTEC Co., LTD, product name: UNIVERSAL TESTING INSTRUMENT model RTG-1310), and was 200 N in the longitudinal direction and 150 N in the lateral direction.

TABLE 1

| | type of yarn | count | twist | diameter of single yarn | the number of yarns/inch |
|---|---|---|---|---|---|
| warp yarn | polyester/ rayon = 65/35 | 20 | single yarn | 1.7d | 86 |
| weft yarn | polyester/ rayon = 65/35 | 20 | four-ply | 1.3d | 42 |

A resin solution having the following configuration was prepared.

Polycarbonate Polyurethane (manufactured by DIC Corporation, product name: MP-865PS): 40 parts by mass Organic phosphate compound (flame retardant) (manufactured by Archroma Japan, KK, product name: PEKOFLAM STC, particle diameter: 3 μm): 10 parts by mass Dimethylformamide: 60 parts by mass The woven fabric was impregnated with the resin solution by being soaked in the resin solution for 1 minute, and then, this was soaked in water for 10 minutes to remove the solvent, and the polyurethane was solidified.

Next, the woven fabric was dried for 10 minutes under hot air at 120° C. to form a base cloth layer (thickness: 1.1 mm) having a porous structure.

Next, one surface of the base cloth layer was subjected to buff processing using a buffing machine (manufactured by MEINAN MACHINERY WORKS, INC, product name: A-5) to be roughened, and a napped surface was provided.

(Formation of Skin Layer)

An application liquid for forming a skin layer, which has the following configuration, was prepared.

Silicone-modified polyurethane resin (manufactured by DIC Corporation, product name: NY-373): 60 parts by mass Pigment (manufactured by DIC Corporation, product name: DIALAC BLACK L-1770S): 40 parts by mass Solvent (manufactured by Nissan Chemical Industries, Ltd., product name: DMF): 10 parts by mass The application liquid for forming a skin layer was applied to an embossed release paper that had been subjected to surface release processing to provide a release layer (manufactured by Dai Nippon Printing Co., Ltd., DE-41: paper thickness average 140 μm), as a temporarily support, and was dried by heating for 1 minute at 135° C. to form a silicone-modified polyurethane skin layer (thickness: 40 μm, amount after drying: 35 g/m$^2$).

(Formation of Adhesive Layer)

An application liquid for forming an adhesive layer, which has the following configuration, was prepared.

Polycarbonate polyurethane resin (manufactured by DIC Corporation, product name: CRISVON TA 205FT) 100 parts by mass Cross-linking agent (manufactured by DIC Corporation, product name: BURNOCK DN-950): 12 parts by mass Cross-linking promoter (manufactured by DIC Corporation, product name: CRISVON ACCEL T-81E): 1 part by mass Solvent (manufactured by Nissan Chemical Industries, Ltd., product name: DMF): 60 parts by mass Next, the application liquid for forming an adhesive layer was applied on the skin layer, and was dried by heating for 1 minute at 130° C. to form a polyurethane adhesive layer (thickness: 40 μm, application amount after drying: 35 g/m$^2$).

Next, the napped surface of the base cloth layer was made to be opposed to a surface of the adhesive layer, the base cloth layer and the adhesive layer were thermocompression bonded for 1 second at 150° C. and matured, and the adhesive agent was reacted and solidified.

After solidifying the adhesive agent, the release paper was peeled off from the skin layer.

(Formation of Abrasion-Resistant Layer)

An application liquid for forming an abrasion-resistant layer, which has a configuration shown in the following Table 2, was prepared. Each component is as follows.

Polycarbonate urethane (main agent): manufactured by Stahl Japan Limited, product name: WF-13-139

Silicone (lubricant): manufactured by BYK Japan KK, product name: BYK-306

Carbodiimide (cross-linking agent): manufactured by Nisshinbo Chemical Inc., product name: E-02

TABLE 2

| component | amount blended (g) | solid content (mass %) | solid content (g) |
|---|---|---|---|
| Polycarbonate urethane (main agent) | 100 | 25 | 25 |
| Silicone (lubricant) | 15 | 29.5 | 4.5 |
| Carbodiimide (cross-linking agent) | 12 | 50 | 6 |
| Total | 127 | 28.0 | 35.5 |

The application liquid for forming an abrasion-resistant layer was applied on the skin layer by roll coating, and was dried by heating for 1 minute under hot air at 130° C. In this manner, an abrasion-resistant layer (thickness: 7 μm, application amount after drying: 4.5 g/m$^2$) was formed.

(Perforation Processing)

Holes were formed by a punching roll in a laminate (synthetic leather) obtained through the above-described steps, in which the base cloth layer, the adhesive layer, the skin layer, and the abrasion-resistant layer are layered, and a laminated sheet having air holes was obtained.

The diameter, the pitch P, and the aperture ratio of the air holes in the laminated sheet are as follows.

Hole diameter: 1.4 mm
Pitch P: 5.0 mm
Aperture ratio: 14%

[Evaluations]

For the obtained laminated sheet, the following evaluations on an appearance of the holes, tear strength, flame resistance, and air permeability were conducted.

(Distortion of Air Holes)

For 10 air holes among the air holes formed in the laminated sheet, distortion of the circle of the opening was visually evaluated on a 5-point scale from 1 to 5. A higher point indicates that the circle is closer to a circle as when performing perforation processing in genuine leather, and a lower point indicates that the distortion is larger.

(Fluff in Edge Parts of Air Holes)

For 10 air holes among the air holes formed in the laminated sheet, fluff on peripheries of the air holes was visually evaluated on a 5-point scale from 1 to 5. A higher point indicates that there is less fluff as in the case of performing perforation processing in genuine leather, and a lower point indicates that there is more fluff.

(Fraying Yarns in Air Holes)

For 10 air holes among the air holes formed in the laminated sheet, fraying yarns in the air holes were visually evaluated on a 5-point scale from 1 to 5. A higher point indicates that there are fewer fraying yarns.

(Tear Strength)

Tear strength of the laminated sheet was measured by JIS L1096 8.15.4 C method, and was evaluated on the following 5-point scale from 1 to 5.
5: tear strength of 100 N or more
4: tear strength of from 80 N to less than 100 N
3: tear strength of from 60 N to less than 80 N
2: tear strength of from 40 N to less than 60 N
1: tear strength of less than 40 N (Flame Resistance)

Flame resistance of the laminated sheet was measured by FMVSS No. 302 flammability test (ISO3795, JIS D1201), and was evaluated on a 5-point scale from 1 to 5.

5: burning rate=0 mm/min
4: 0 mm/min<burning rate≤50 mm/min
3: 50 mm/min<burning rate≤80 mm/min
2: 80 mm/min<burning rate≤100 mm/min
1: 100 mm/min<burning rate (Air Permeability)

Air permeability of the laminated sheet was measured by JIS L1096 8.27.1 A method, and was evaluated on a 5-point scale from 1 to 5.

5: 130 cc/cm$^2$·s or more
4: from 100 cc/cm$^2$·s to less than 130 cc/cm$^2$·s
3: from 80 cc/cm$^2$·s to less than 100 cc/cm$^2$·s
2: from 60 cc/cm$^2$·s to less than 80 cc/cm$^2$·s
1: less than 60 cc/cm$^2$·s Example 2

A laminated sheet was manufactured in the same manner as Example 1 except that a base cloth was manufactured by changing the warp yarn from No. 20 count to No. 30 count and changing the weft yarn from No. 20 count four-ply to No. 20 count three-ply, respectively. Tear strength by a trapezoid method of a woven fabric used as the base cloth was 160 N in the longitudinal direction and 130 N in the lateral direction.

The obtained laminated sheet was evaluated in the same manner as Example 1.

Example 3

A laminated sheet was manufactured in the same manner as Example 1 except that, in a resin solution for impregnating into a woven fabric, the flame retardant having a particle diameter of 3 μm was changed to a flame retardant having a particle diameter of 20 μm (manufactured by Archroma Japan, KK, product name: PEKOFLAM ATC).

The obtained laminated sheet was evaluated in the same manner as Example 1.

Example 4

A laminated sheet was manufactured in the same manner as Example 1 except that an abrasion-resistant layer was not formed on the skin layer.

The obtained laminated sheet was evaluated in the same manner as Example 1.

Comparative Example 1

A laminated sheet was manufactured in the same manner as Example 1 except that, in a resin solution for impregnating a woven fabric, the organic phosphate compound was changed to aluminum hydroxide.

The obtained laminated sheet was evaluated in the same manner as Example 1.

Comparative Example 2

Synthetic leather was manufactured in the same manner as Example 1 except that a resin solution was prepared without the organic phosphoric acid chloride of the resin solution for impregnating into the woven fabric that was used in Example 1, and a woven fabric was impregnated with the resin solution in the same manner as Example 1, and the rear surface was coated with a flame retardant (phosphorous compound, product name: NONNEN R031-5, manufacturer: MARUBISHI OIL CHEMICAL CO., LTD.).

The obtained laminated sheet was evaluated in the same manner as Example 1.

Comparative Example 3

A laminated sheet was manufactured in the same manner as Example 1 except that the base cloth was changed to a tricot satin texture (course/wale=53/45, tear strength by trapezoid method of 170 N or more in longitudinal direction and 150 N or more in lateral direction).

The obtained laminated sheet was evaluated in the same manner as Example 1.

Evaluation results of the laminated sheets manufactured in Examples and Comparative Examples are shown in Table 3.

Figure 3:
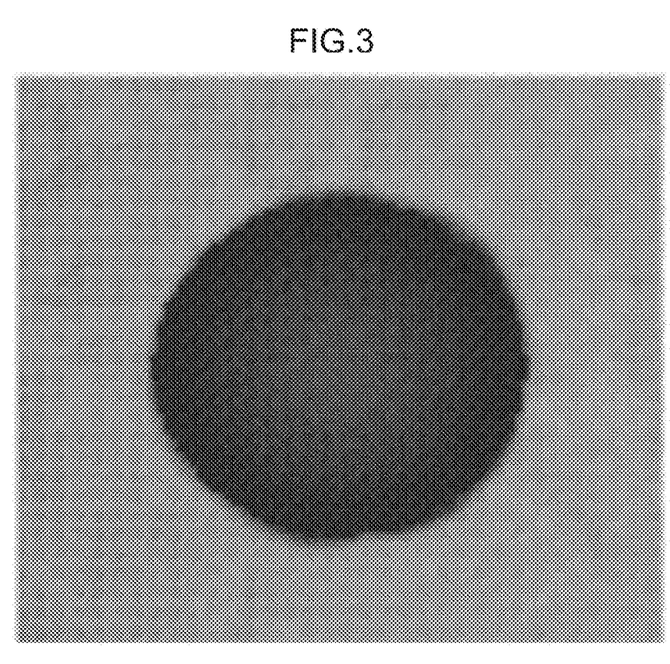
FIG. 3 is a diagram obtained by photographing an appearance of a hole of air holes of a laminated sheet manufactured in Example 1.
Figure 4:
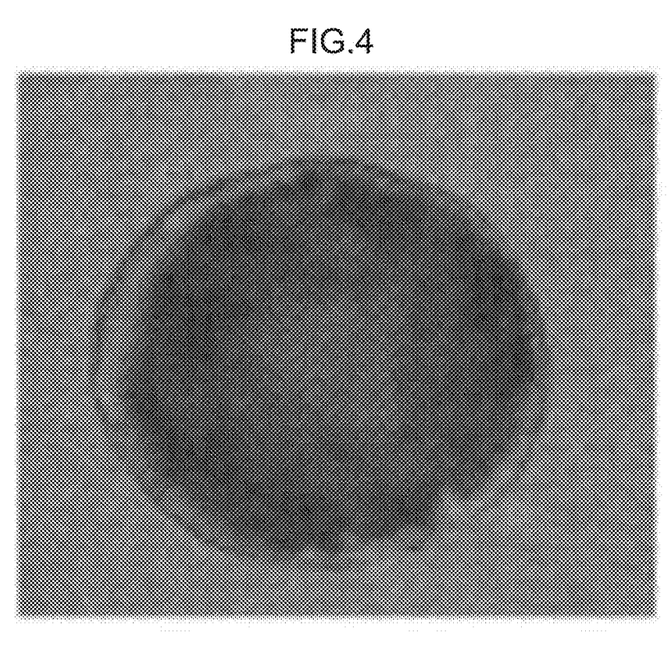
FIG. 4 is a diagram obtained by photographing an appearance of a hole of air holes of a laminated sheet manufactured in Comparative Example 2.
Figure 5:
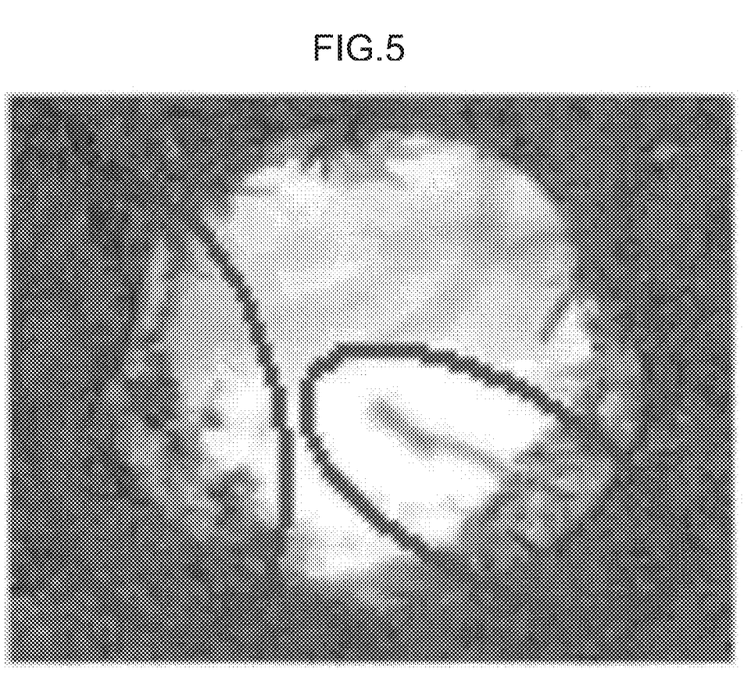
FIG. 5 is a diagram obtained by photographing an appearance of a hole of air holes of a laminated sheet manufactured in Comparative Example 3.

Appearances of air holes of the laminated sheets manufactured in Example 1, Comparative Example 2, and Comparative Example 3 are illustrated in FIG. 3, FIG. 4, and FIG. 5, respectively.

TABLE 3

|  | distortion of hole | fluff | fraying yarns | tear strength | flame resistance | air permeability | total points |
|---|---|---|---|---|---|---|---|
| Example 1 | 5 | 5 | 5 | 5 | 5 | 5 | 30 |
| Example 2 | 5 | 5 | 5 | 4 | 5 | 5 | 29 |
| Example 3 | 5 | 5 | 5 | 5 | 4 | 5 | 29 |
| Example 4 | 5 | 5 | 5 | 5 | 5 | 5 | 30 |
| Comparative Example 1 | 5 | 5 | 5 | 5 | 3 | 5 | 28 |
| Comparative Example 2 | 5 | 5 | 5 | 5 | 1 | 5 | 26 |
| Comparative Example 3 | 4 | 5 | 4 | 2 | 3 | 4 | 21 |

The disclosure of Japanese Patent Application No. 2012-276183, filed on Dec. 18, 2012, is incorporated herein by reference in its entirety.

All publications, patent applications, and technical standards mentioned in this description are incorporated herein by reference to the same extent as if each individual publication, patent application, or technical standard was specifically and individually indicated to be incorporated by reference.

The invention claimed is:

1. A laminated sheet, comprising:
    a base cloth layer having a porous structure that is obtained by impregnating a woven fabric, which has a tear strength by a trapezoid method of 150 N or more in a longitudinal direction and 100 N or more in a lateral direction, with a resin composition containing a polyurethane resin and an organic flame retardant; and
    a skin layer that is layered on the base cloth layer,
    the laminated sheet having plural air holes penetrating in a thickness direction,
    wherein the woven fabric is twilled using a No. 5 to No. 30 count single yarn as a warp yarn and a No. 10 to No. 40 count two-ply to four-ply twisted yarn as a weft yarn.

2. The laminated sheet according to claim 1, wherein the organic flame retardant is a phosphorous flame retardant.

3. The laminated sheet according to claim 1, further comprising an abrasion-resistant layer on the skin layer.

4. The laminated sheet according to claim 2, further comprising an abrasion-resistant layer on the skin layer.

5. The laminated sheet according to claim 3, wherein the abrasion-resistant layer comprises a resin, a lubricant, and a cross-linking agent.

6. The laminated sheet according to claim 4, wherein the abrasion-resistant layer comprises a resin, a lubricant, and a cross-linking agent.

7. The laminated sheet according to claim 6, wherein a hole diameter of each of the air holes is from 1.0 to 2.0 mm.

8. The laminated sheet according to claim 6, wherein a hole diameter of each of the air holes is from 1.0 to 2.0 mm.

9. The laminated sheet according to claim 1, wherein a content of the organic flame retardant in the base cloth layer is from 10 to 30 parts by mass with respect to 100 parts by mass of the polyurethane resin.

10. The laminated sheet according to claim 8, wherein a content of the organic flame retardant in the base cloth layer is from 10 to 30 parts by mass with respect to 100 parts by mass of the polyurethane resin.

11. An automobile interior material, comprising the laminated sheet according to claim 1.

12. An automobile interior material, comprising the laminated sheet according to claim 10.

13. A method of manufacturing a laminated sheet according to claim 1, the method comprising:
- a step of impregnating a woven fabric, which has a tear strength by a trapezoid method of 150 N or more in a longitudinal direction and 100 N or more in a lateral direction, with a resin solution containing a polyurethane resin, an organic flame retardant, and a solvent,
- a step of soaking the woven fabric, which has been impregnated with the resin solution, in water to remove the solvent from the woven fabric and solidify the polyurethane resin,
- a step of drying the woven fabric, in which the polyurethane resin has been solidified, to form a base cloth layer having a porous structure,
- a step of roughening one surface of the base cloth layer,
- a step of forming a laminate in which a skin layer is layered on the roughened surface of the base cloth layer, and
- a step of forming plural air holes that penetrate in a thickness direction of the laminate.

* * * * *